US012704872B2

(12) United States Patent
Hunter

(10) Patent No.: US 12,704,872 B2
(45) Date of Patent: Aug. 11, 2026

(54) METHODS AND SYSTEMS FOR IMPLEMENTING DIGITAL TO ANALOGUE CONVERTERS IN QUANTUM COMPUTERS

(71) Applicant: Universal Quantum Ltd, Brighton (GB)

(72) Inventor: Iain Mcintosh Hunter, Brighton (GB)

(73) Assignee: Universal Quantum Ltd, Brighton (GB)

( * ) Notice: Subject to any disclaimer, the term of this patent is extended or adjusted under 35 U.S.C. 154(b) by 0 days.

(21) Appl. No.: 18/424,570

(22) Filed: Jan. 26, 2024

(65) Prior Publication Data

US 2024/0419207 A1 Dec. 19, 2024

Related U.S. Application Data

(63) Continuation of application No. PCT/GB2022/052014, filed on Jul. 29, 2022.

(51) Int. Cl.
*G06F 1/04* (2006.01)
*G06N 10/40* (2022.01)

(52) U.S. Cl.
CPC ............... *G06F 1/04* (2013.01); *G06N 10/40* (2022.01)

(58) Field of Classification Search
CPC .................................. G06F 1/04; G06N 10/40
(Continued)

(56) References Cited

U.S. PATENT DOCUMENTS 5,680,070 A * 10/1997 Anderson ............ H03K 19/177 327/345
10,276,256 B1 * 4/2019 Hennecke ............ G11C 27/024
(Continued)

FOREIGN PATENT DOCUMENTS

GB 2228155 A * 8/1990 ............. H03M 1/42
JP 2007266872 A 10/2007
(Continued)

OTHER PUBLICATIONS

Akhtar, M. et al. A high-fidelity quantum matter-link between ion-trap microchip modules. arXiv preprint arXiv:2203.14062v1 (Mar. 26, 2022). 8 pages.

(Continued)

*Primary Examiner* — Paul R. Myers
(74) *Attorney, Agent, or Firm* — Wilson Sonsini Goodrich & Rosati

(57) ABSTRACT

There is provided an trapped ion processor comprising a DAC chamber, an ASIC, a digital control line between the DAC chamber and the ASIC and an analogue control line between the DAC chamber and the ASIC. The ASIC comprises a plurality of channels, each channel comprising a DC electrode, a first analogue memory cell and a second analogue memory cell. The DAC chamber comprises a DAC configured to generate an analogue signal and a DAC controller configured to generate timing control signals, the timing control signals comprising one or more sample timing signals to control when the analogue signal is sampled, as a voltage signal, by one or more of the plurality of the channels, and one or more synchronisation signals to control when the sampled voltage signal is applied to the respective DC electrode. The analogue control line transmits the analogue signal from the DAC to the plurality of channels and wherein the digital control line transmits the timing control signals from the DAC controller to the plurality of channels, the timing control signals controlling when the analogue signal is sampled, as a voltage, by either the first or the second analogue memory cell of each of a plurality of channels and controlling when the sampled voltage signal is applied to the respective DC electrode of each of a plurality of channels.

19 Claims, 4 Drawing Sheets

(58) Field of Classification Search
USPC .......................................................... 713/600
See application file for complete search history.

(56) References Cited

U.S. PATENT DOCUMENTS

| | | | | |
|---|---|---|---|---|
| 10,635,990 | B1 * | 4/2020 | Park ..................... | G11C 27/024 |
| 11,842,250 | B2 * | 12/2023 | Zheng .................... | G06N 3/045 |
| 2003/0214521 | A1 * | 11/2003 | Osame ................. | G09G 3/3216<br>345/690 |
| 2005/0139757 | A1 * | 6/2005 | Iwanczyk ............. | G01T 1/2928<br>257/E31.015 |
| 2021/0336777 | A1 * | 10/2021 | Brunner ................ | H04L 9/0858 |
| 2021/0341979 | A1 * | 11/2021 | Chakraborty ........ | G05B 19/042 |
| 2022/0335324 | A1 * | 10/2022 | Zhang .................... | G06N 10/70 |

FOREIGN PATENT DOCUMENTS

| | | | |
|---|---|---|---|
| WO | WO-2022123268 | A2 | 6/2022 |
| WO | WO-2022123269 | A1 | 6/2022 |
| WO | WO-2023275556 | A1 | 1/2023 |
| WO | WO-2023007189 | A1 | 2/2023 |
| WO | WO-2023007190 | A1 | 2/2023 |

OTHER PUBLICATIONS

Akhtar, M. et al. A high-fidelity quantum matter-link between ion-trap microchip modules. arXiv preprint arXiv:2203.14062v2 (Apr. 5, 2022). 8 pages.
Akhtar, M. et al. A high-fidelity quantum matter-link between ion-trap microchip modules. arXiv preprint arXiv:2203.14062v3 (Nov. 20, 2022). 10 pages.
Akhtar, M. et al. A high-fidelity quantum matter-link between ion-trap microchip modules. Nature Communications 14(1):531, 1-8 (2023).
GB2111045.7 Office Action with Search Report dated May 9, 2022.
Geck, Lotte et al. Control Electronics for Semiconductor Spin Qubits. arXiv, Mar. 12. 2019. Available at URL:https://arxiv.org/abs/1903.04872 pp. 1-15.
Lekitsch, Bjoern, et al. Blueprint for a microwave trapped ion quantum computer. Science Advances 3.2 (2017): e1601540. 11 pages.
Metodi, Tzvetan S. et al. Investigation of the classically controlled ion-motion interface in a multiplexed ion-trap quantum computer. Proceedings of SPIE 6573:1-11 (2007).
PCT/GB2022/052014 International Preliminary Report on Patentability dated Feb. 8, 2024.
PCT/GB2022/052014 International Search Report and Written Opinion dated Nov. 7, 2022.

* cited by examiner

100 – quantum computer area
200 – DAC area
110 – channel
120 – channel
130 – channel
140 – channel
150 – electrode
301 – analogue control line
302 – digital control line
201 – DAC element
202 – timing controller
203 – reference signal
205 – controller
160 – decoder
153 – first switch
154 – capacitor
152 – capacitor
151 – second switch 100 – quantum computer area
200 – DAC area
110 – channel
120 – channel
130 – channel
140 – channel
150 – electrode
301 – analogue control line
302 – digital control line
201 – DAC element
202 – timing controller
203 – reference signal
205 – controller
163 – first switch
161 – second switch
162 – capacitor
173 – first switch
171 – second switch
172 - capacitor

METHODS AND SYSTEMS FOR IMPLEMENTING DIGITAL TO ANALOGUE CONVERTERS IN QUANTUM COMPUTERS

CROSS-REFERENCE

This application is a continuation application of Serial No. PCT/GB2022/052014, filed Jul. 29, 2022, which claims the benefit of GB Application No. 2111045.7 filed on Jul. 30, 2021, which applications are each incorporated herein by reference in their entireties.

FIELD

The present invention relates to providing a scalable system for DACs for an ion trap quantum computer.

BACKGROUND

Quantum computing in general, unlike so-called "classical computing", relies on the quantum mechanical properties of particles or matter to produce or alter data. The data may be represented by quantum bits or "qubits", which is a two state quantum mechanical system. Unlike classical computing, the qubit may be in superposition of quantum states. Another feature of quantum computing is the entanglement between qubits in which the state of one particle or atom is influenced by another particle or atom.

Quantum mechanical qubits are able to encode information as combinations of zeros and ones simultaneously. Such properties open numerous complex numerical applications that are traditionally difficult for classical computers. Examples include artificial Intelligence, image processing and recognition, cryptography, or secure communications and so on.

Within an ion hyperfine electronic states (Zeeman split states) can be revealed by the use of a magnetic field and the different electron levels used as the different qubit states and electrons moved between the levels using microwave radiation or lasers.

In ion trap quantum computers (quantum charged coupled devices) ion traps can be used to control ions used in quantum computation and surface electrodes are used to generate electric fields to manipulate and trap the ions suspended in free space. The surface electrode potentials of an ion-trap are in turn controlled by DACs. State-of-the-art quantum computers use many DACs of the same type, for example 16 bit DACs with a better than 1 MHz update rate.

SUMMARY

Each individual electrode is independently controllable and each electrode has a corresponding DAC coupled thereto. The timing at which the electrodes must be carefully controlled. Often the electrodes are all updated synchronously, although alternatively they could be updated in real time.

As the ion trap area increases so too does the number of electrodes and DAC. Within a quantum computer DACs need to be low noise with long term stability. In areas in which the ions are shuttled the DACs may also be high speed. To achieve these characteristics the area for the DAC is generally considerably larger than the associated DC electrode.

One solution to this has been to arrange the high quality DACs outside the vacuum part of the quantum computer and this has the advantage that the area is unrestricted. However, connectivity to the electrodes is limited by the perimeter thereby limiting the scalability of this solution.

It is an aim of the invention to provide a scalable system in which the quality of the DACs is maintained.

According to the invention there is therefore provided an ion trap quantum computer comprising a DAC chamber, an ASIC, a digital control line between the DAC chamber and the ASIC and an analogue control line between the DAC chamber and the ASIC, the ASIC comprising a plurality of channels, each channel comprising a DC electrode, a first analogue memory cell and a second analogue memory cell. The DAC chamber comprises a DAC configured to generate an analogue signal, a DAC controller configured to generate timing control signals comprising one or more sample timing signals and one or more synchronisation signals. The one or more sample timing signals control when the analogue signal is sampled, as a voltage signal, to one or more of the plurality of channels and the one or more synchronisation signals control when the sampled voltage signal is applied to the respective DC electrode. The analogue control line transmits the analogue signal from the DAC to the plurality of channels and the digital control line transmits the timing control signals from the DAC controller to the plurality of channels.

According to this arrangement the DAC is therefore outside the cooled area and connectivity is restricted to a few control lines ensuring that the number of control lines does not restrict the design. High quality DACs can be used outside the vacuum area and the size of the computer is not limited by the number of transmission lines.

The first analogue memory cell and the second analogue memory cell may be in series with the first analogue memory cell being electrically coupled to the DC electrode. Arranging the analogue memory cells in series means that the voltage signal can be stored in one of the analogue memory cells until the time to apply it to the DC electrode using the other analogue memory cell. Each memory cell may comprise a capacitor and switch. The switch may be a MOSFET or a MEMS.

The timing control signals may comprise one or more sample timing signals for a plurality of the channels. The one or more sample timing signals are configured to control when the second analogue memory cell of the respective channel samples the analogue signal. Each channel can therefore sample the analogue signal at a different time.

The timing control signals may comprise one or more synchronisation signals for a plurality of the channels. The synchronisation signals are configured to control when the voltage signal in the second analogue memory cell is applied to the first memory cell and the DAC electrode. The synchronisation signal may indicate that the voltage signals in all the channels should be applied to the respective electrodes simultaneously. Alternatively, the voltage signals in different channels may be applied at different times.

Alternatively, the first analogue memory cell and the second analogue memory cell may be arranged in parallel. In this arrangement each of the first analogue memory cell and the second analogue memory cell comprises a first switch electrically coupled to the DC electrode, a second switch electrically coupled to the analogue control line and a capacitor arranged between the first and second switch. A voltage signal can be stored in either the first or the second analogue memory cell and when the first switch is closed the voltage applied to the electrode.

When the analogue memory cells are arranged in parallel the timing control signals may comprise one or more sample timing signals for each of a plurality of the channels and wherein the sample timing signal is configured to control when either the first or the second analogue memory cell samples, as a voltage signal, the analogue signal. In particular there may be a sample timing signal for each analogue memory cell in each channel.

When the analogue memory cells are arranged in parallel the timing control signals may comprise one or more synchronisation signals for each of a plurality of the channels and wherein the synchronisation signal is configured to control when the voltage signal in either the first or second analogue memory cell is applied to the DAC electrode. In particular there may be a synchronisation The trapped ion processor may comprise a third analogue memory cell. This may be in series, or in parallel with the other analogue memory cells.

The ASIC may further comprise a decoder configured to decode the one or more timing signals. The decoder may decode a single sample timing signal into a plurality of signal timing signals for the plurality of channels. The decoder may decode a single synchronisation signal into a plurality of synchronisation signals for the plurality of channels. The decoder may be a shift register configured to transmit timing control signals to a plurality of the channels.

The DAC may further comprise a multiplexing controller configured to multiplex the sample timing signals and the decoder may be a multiplexer configured to multiplex the sample timing signals.

The DAC may be configured to generate a periodic signal. The timing signals then indicate which part of the periodic signal should be sampled for each channel. Multiple channels can sample the periodic signal at the same time.

According to the invention there is provided a method of applying DAC control to a plurality of electrodes in an ion trap quantum computer, the method comprising generating an analogue signal by a DAC and generating digital timing signals to control application of the analogue signal to each of the plurality of electrodes.

According to the invention there is a method of applying DAC control to an ASIC forming a trapped ion processor, the ASIC comprising a plurality of channels, each channel comprising a first and second analogue memory cell and a DC electrode. The method comprises generating an analogue signal by a DAC and transmitting along an analogue control line to the ASIC, generating timing signals to control application of the analogue signal to each of the plurality of electrodes, the timing signals comprising one or more sample timing signals and one or more synchronisation signals. The one or more sample timing signals and one or more synchronisation signals are transmitted to the ASIC along a digital control line. The analogue signal is sampled, as a voltage signal, by each of a plurality of second memory cells of the channels at a time controlled by a respective sample timing signal and the voltage signal applied to the first analogue memory cell and DC electrode at a time controlled by the respective synchronisation signal.

The one or more sample timing signals may be decoded into a sample timing signal for each channel. For example there may be only one sample timing signal transmitted from the DAC area which is then decoded into a sample timing signal for each channel. Similarly, the one or more synchronisation timing signals may be decoded into a synchronisation signal for each channel. For example there may be only one synchronisation timing signal transmitted from the DAC area which is then decoded into a synchronisation timing signal for each channel. The decoding may be via a shift register or could be via multiplexing.

DETAILED DESCRIPTION

Figure 1:
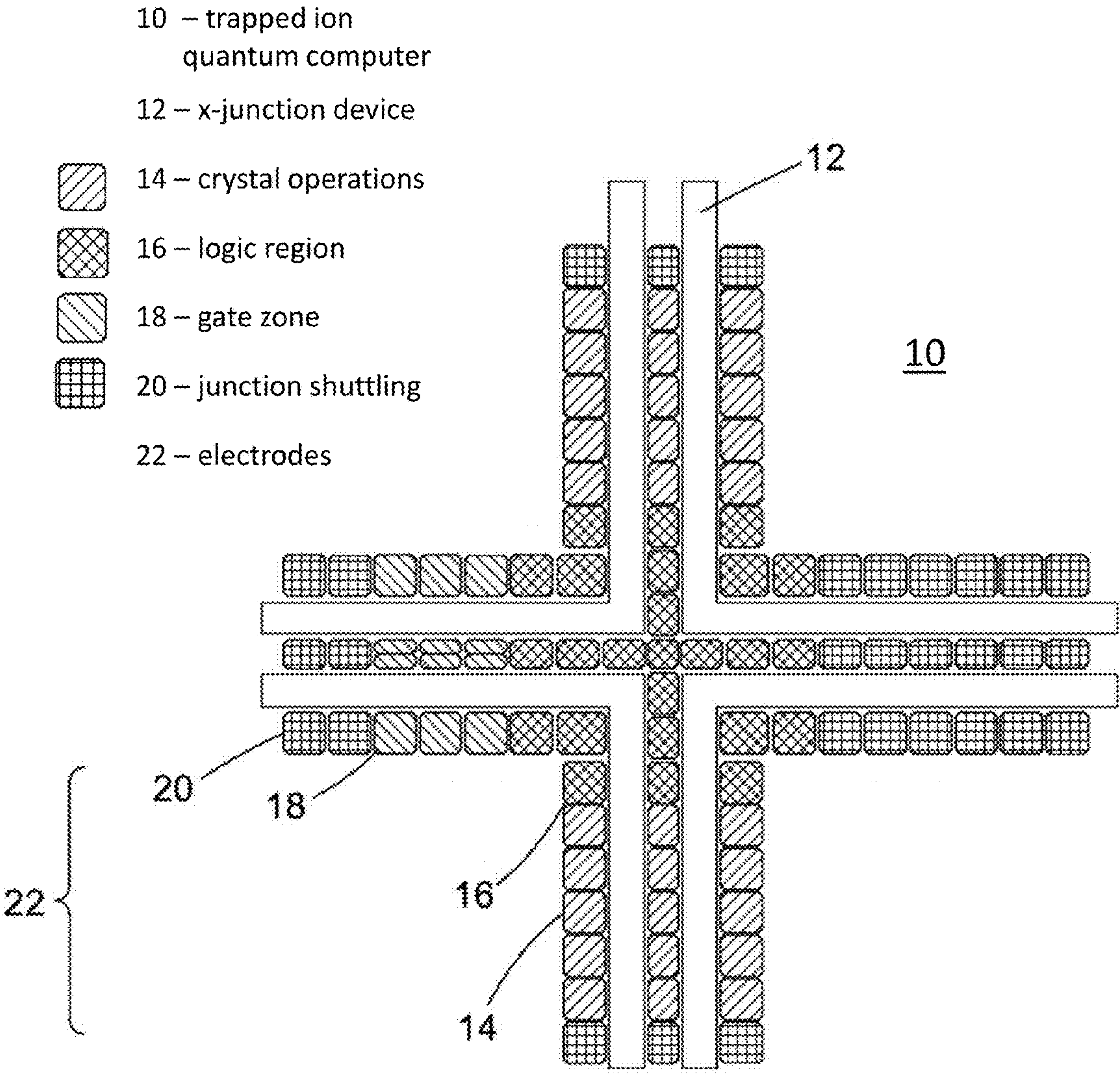
FIG. 1 depicts an array of electrodes used in conjunction with the invention.

Referring to FIG. 1, there is an example arrangement of electrodes used in conjunction with this invention. FIG. 1 shows an x-junction device 12 in a trapped ion quantum computer 10. The x-junction 12 comprises a plurality of electrodes 22 configured to trap an ion in an area of the x-junction device 12. Each electrode 22 is driven by a DAC to carry out the function of the area of the x-junction device 12. The x-junction device 12 is divided into areas. The areas of the x-junction device 12 can be divided into crystal operations 14, junction shuttling 16, logic region/gate zone 18 and linear shuttling 20 depending on the function being carried out in each area.

Figure 2:
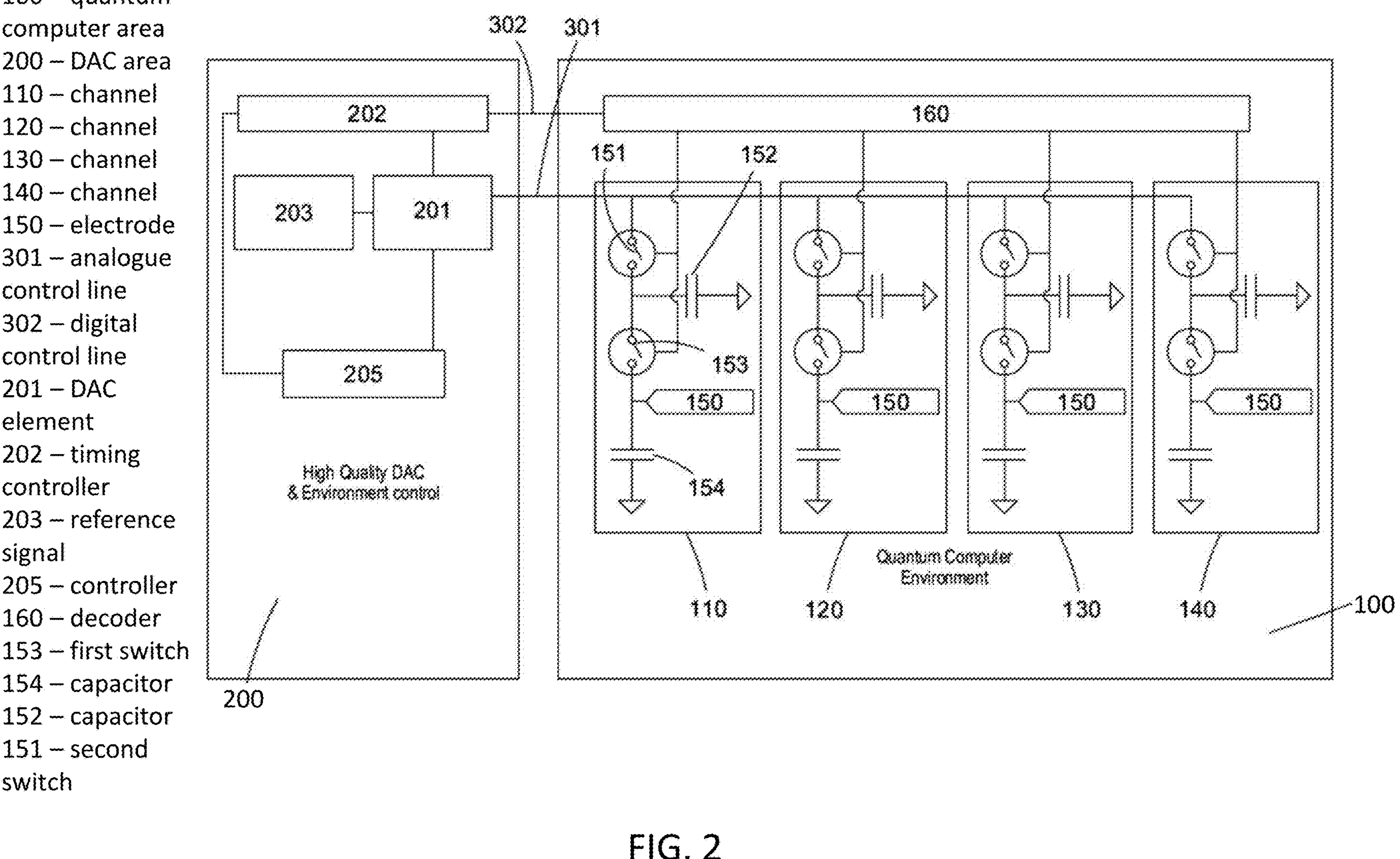
FIG. 2 depicts an arrangement according to the invention.

FIG. 2 depicts an arrangement according to the invention. As can be seen there are two areas: a quantum computer area 100 and a DAC area 200. In order to minimise errors resulting from the qubits changing state the quantum computer area is cooled to minimise electrical noise. The quantum computer area may be cooled down to 4K or even 2K and be at a vacuum of less than 10−11 Torr.

Also to minimise to physical collisions of the ions, the quantum computing area is in a vacuum, preferably a vacuum of 10−11 Torr. To maintain this clean, cold environment the quantum computer area is sealed.

Operating at very cold temperatures affects the electrical characteristics of DACs, which are often arranged inside the clean, cold area. Arranging the DAC outside the clean, cold area means that the DAC can operate at room temperature and standard operating conditions for which it is designed. This means that the electrical parameters are within the normal operating range. Furthermore, by arranging the DAC outside the vacuum there are no problems with outgassing.

The quantum computer environment is arranged around an ASIC and comprises a plurality of channels 110, 120, 130, 140, each channel comprising an electrode 150 and associated electrical components.

The DAC is located in the DAC area and the electrodes and ion trap are located in the clean cold area. Between the DAC area and the quantum computer area are an analogue control line 301 and a digital control line 302, transmitting signals between the two areas. An advantage of the present invention is that the number of lines between the two areas is minimised: instead of a control line for each electrode (and associated DAC) there are two control lines, where previously there may have been hundreds or even thousands.

The DAC area comprises a DAC element 201 which is configured to generate a DAC signal. Preferably this is a periodic signal. The DAC element may comprises a plurality of DACs which are combined to form a single DAC output. The DAC is selected to have a high accuracy, low noise output. As it is in standard operating conditions a wider variety of DACs can be used. The DAC element transmits an analogue DAC signal through the analogue channel.

The DAC area 200 also comprises a DAC timing controller 202. This generates digital timing signals which are transmitted via the digital control line. The timing signals include a sample timing signal and a synchronisation signal. The sample timing signal indicates the timing at which second analogue memory devices sample the analogue DAC signal. For example the first channel may sample the DAC signal at clock time 5, the second channel may sample the DAC signal at clock time 3, the third channel may sample the DAC signal at time 8 and the fourth signal may sample the signal at time 6. The voltage signal is then stored in the second analogue memory device. The digital timing signals also include a synchronisation signal which indicates when the voltage stored in the second analogue memory cell should be applied to the first analogue memory cell and the DC electrode.

There will additionally be reference signal 203 in the DAC area 200. This provides a reference value of, for example, 15V, for the DAC element 201.

The DAC area also comprises a controller 205. The controller controls the DAC element and also the DAC timing controller. It may, for example control the DAC element to generate a different periodic signal. It also controls the DAC timing controller to control the timings at which the different channels sample the analogue DAC signal.

Although depicted as being a distinct component the controller could also be integrated within the DAC timing controller and DAC element and not form a separate part.

On the ASIC within the quantum computing environment there is a decoder 160 which, in this example, is a shift register. The shift register then provides individual signals to each of the channels 110, 120, 130, 140 which indicates when the analogue signal is sampled and when the sampled voltage is applied to the DC electrode.

Individual timing signals are then transmitted, through digital control lines, to individual channels. Each channel comprises an electrode 150 and a first switch 153 and capacitor 154 which form the first analogue memory cell and a capacitor 152 and a second switch 151 which form the second analogue memory cell. The first and second switches may be transistors, in particular MOSFETs. Individual sample timing signals for each channel then control the second switch. At a timing indicated by the sample timing signal for each channel the second switch 151 of the respective channel is closed, enabling the analogue signal to be sampled. For example, the second switch of the first channel may be switched at time 5, sampling a voltage of 3V and the first switch of the second channel may be sampled at time 3, sampling a voltage of 2V. After sampling the analogue DAC signal the voltage is stored by the capacitor 152.

The timing control signal also comprises synchronisation signal. The shift register 160 generates individual synchronisation signals for each channel which indicates the timing at which the voltage, stored on the respective capacitor 152 should be applied to the electrode 150. The individual synchronisation signals control the first switch 153 and the voltages are applied by closing the first switches 153.

In this example the shift register has two portions: a shift register for the sample timing signal and a shift register for the synchronisation signal.

Thus the timing signals transmitted from the DAC area may comprise a sample timing signal, which indicates the timing at which each respective channel samples the analogue signal, and also a synchronisation signal which indicate when the voltage signal is to be applied to the respective electrode.

Thus, a voltage signal can be stored on the second memory device while the DC electrode is at another voltage. When the synchronisation signal is applied, the stored voltage signal will be transmitted from the second memory device to the first memory device and applied to the DC electrode. Another voltage signal can then be stored or "loaded" to the second analogue memory cell.

Having memory cells so that voltage signals can be stored in advance of being applied to the electrode means that a single analogue signal can be used to generate all the voltage signals and the individual channels sample the signal at a time indicated by the timing signal. The voltage signals are stored until they are applied at a time indicated by the synchronisation signal. This arrangement avoids the need for each channel to have an individual transmission line from outside the ASIC area to inside the ASIC area and therefore enables a greater variety of ASIC designs as it is not restricted by the transmission lines.

Generally voltage signals stored in the second analogue memory cells are applied to the first analogue memory cells and DC electrodes simultaneously. However, in other arrangements they may be applied at different timings.

The example above transmits a single sample timing signal and a single synchronisation signal from the DAC area to the shift register 160. However, an alternative arrangement would be for there to be plurality of multiplexed sample timing signals and synchronisations signals to be transmitted via the digital control line 302. In this arrangement the DAC timing controller 202 would include a multiplexer 202 in the DAC environment and the decoder 160 would be a multiplexer to multiplex the multiplexed sample timing signals and synchronisation signals.

Figure 3:
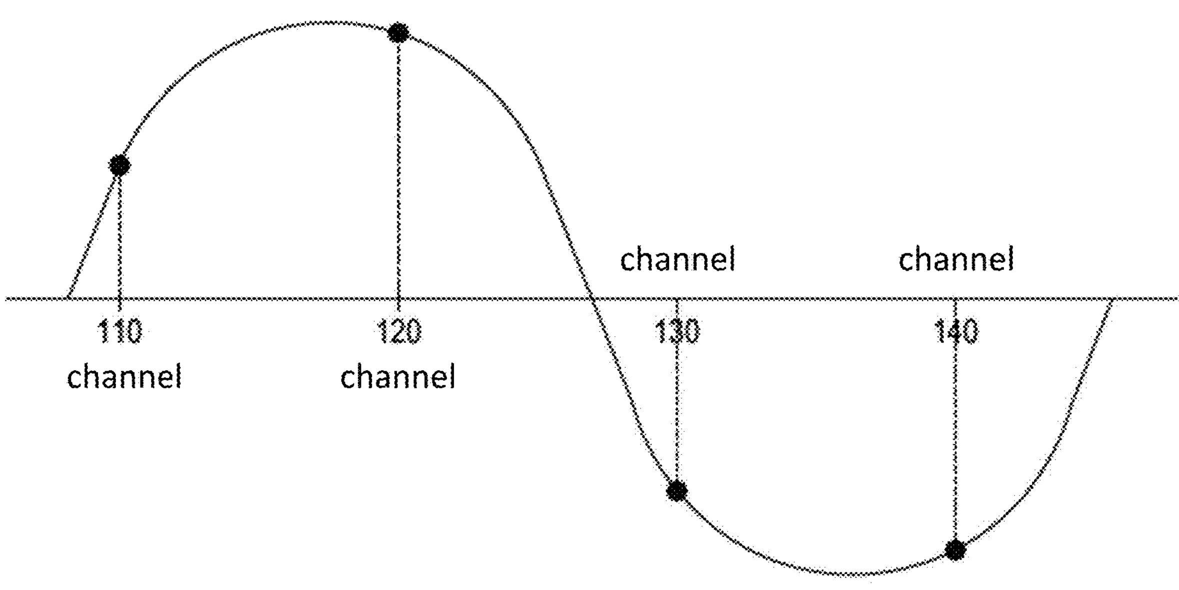
FIG. 3 depicts an analogue signal according to the invention.

FIG. 3 depicts an example analogue signal generated by the DAC element 201. It also depicts examples of when different channels may sample the signal. The signal is sampled by channel 110 at the timing indicated by 110, by the channel 120 at the timing indicated by 120 etc. In this way different voltages are selected and sampled by the different channels.

The example described above uses a periodic signal. However, aperiodic signals could also be used. One example of this would be the analogue signal transmitting the value for the first channel, followed by the value for the second channel followed by the value for the third channel etc.

Figure 4:
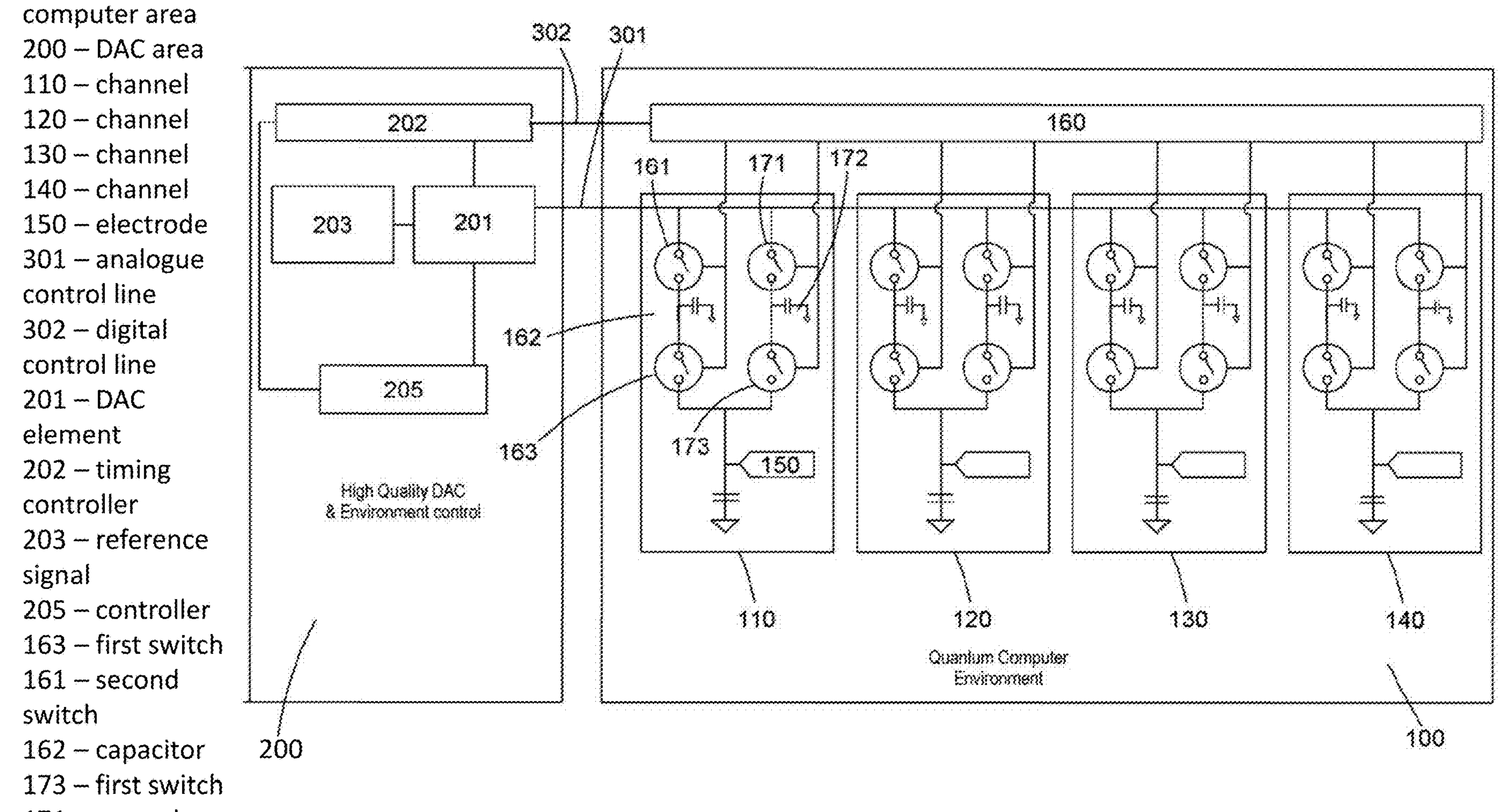
FIG. 4 depicts and alternative arrangement according to the invention.

FIG. 4 depicts an arrangement in which there are memory cells in parallel. A first analogue memory cell has a first switch 163 and a second switch 161 with a capacitor 162 therebetween. A second analogue memory cell has a first switch 173 and a second switch 171 with a capacitor 172. There is also a memory cell, comprising a capacitor, attached to the DC electrode. For the arrangement in FIG. 4 each of the first and second memory cells must have a sample timing signal and a synchronisation signal. The sample timing signal controls when the second switch 161 is closed and the analogue signal is sampled. The voltage signal is then stored on the capacitor of the respective analogue memory cell until the synchronisation signal closes the first switch 163. Once the first switch is closed the voltage is applied to the DC electrode 150. While the voltage from the first analogue memory cell is applied to the DC electrode another voltage can be stored on the second analogue memory cell.

The embodiment described in connection with FIG. 2 has two analogue memory cells: the first with the electrode and the second with a capacitor 152. However, there could equally be a third analogue memory cell, either in series or in parallel. For each additional memory cell there would be an additional timing control signal. The use of additional analogue memory cells would enable more data to be stored in adavance. This is useful if the electrodes are in an area in which high speed is important as a plurality of voltage signals can be stored and applied in quick succession.

Although FIG. 2 and only depict 4 different channels it will be apparent that a quantum computer may have hundreds, or thousands of similar channels, each operating similarly.

Using the arrangement described above high quality DAC components can be used outside the clean, cold environment while maintaining the speed necessary. The DAC area may be in a relatively clean environment but it may not be as clean or have such low pressure as the ion trap area. For example it may have a pressure of 10−3 Torr.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments. It is not limited to the disclosed embodiments and that alternative embodiments could be constructed without departing from the scope of the invention as defined in the appended claims.

What is claimed is:

1. A quantum computer comprising: a quantum processor, the quantum processor comprising:

- an application-specific integrated circuit (ASIC), wherein the ASIC comprises a plurality of channels and a plurality of direct current (DC) electrodes, wherein each DC electrode of the plurality of DC electrodes corresponds to a channel of the plurality of channels;
- a digital-to-analogue converter (DAC) chamber, wherein the DAC chamber comprises:
  - (i) a DAC configured to generate an analogue signal;
  - (ii) a DAC controller configured to generate timing control signals, wherein the timing control signals comprise one or more sample timing signals; and
  - (iii) a multiplexing controller configured to multiplex the sample timing signals;
- an analogue control line between the DAC chamber and the ASIC, wherein the analogue control line is configured to transmit the analogue signal from the DAC to the plurality of channels; and
- a digital control line between the DAC chamber and the ASIC, wherein the digital control line is configured to transmit the timing control signals from the DAC controller to the plurality of channels.

2. The quantum computer of claim 1, wherein the timing control signals are configured to control when the analogue signal is sampled, as a voltage signal, by one or more channels of the plurality of channels, and when the voltage signal is applied to a DC electrode of the one or more channels of the plurality of channels.

3. The quantum computer of claim 2, wherein the timing control signals comprise one or more synchronisation signals.

4. The quantum computer of claim 3, wherein the one or more synchronisation signals are configured to control when the voltage signal is applied to the DC electrode of the channel of the plurality of channels.

5. The quantum computer of claim 1, wherein the one or more sample timing signals are configured to control when a voltage signal is sampled by either a first analogue memory cell of the channel of the plurality of channels or a second analogue memory cell of the channel of the plurality of channels.

6. The quantum computer of claim 3, wherein each channel of the plurality of channels further comprises a first analogue memory cell and a second analogue memory cell.

7. The quantum computer of claim 6, wherein the first analogue memory cell and the second analogue memory cell are in series and the first analogue memory cell is electrically coupled to the DC electrode.

8. The quantum computer of claim 7, wherein the first analogue memory cell comprises a capacitor and a switch and the second analogue memory cell comprises a capacitor and a switch.

9. The quantum computer of claim 7, wherein the one or more sample timing signals are configured to control when the second analogue memory cell of the channel of the plurality of channels comprising the second analogue memory cell samples the voltage signal.

10. The quantum computer of claim 7, wherein the one or more synchronisation signals are configured to control when a sampled voltage signal of the second analogue memory cell is applied to the first analogue memory cell and the DC electrode of the channel of the plurality of channels.

11. The quantum computer of claim 6, wherein the first analogue memory cell and the second analogue memory cell are in parallel.

12. The quantum computer of claim 11, wherein both of the first analogue memory cell and the second analogue memory cell comprise (i) a first switch electrically coupled to the DC electrode, (ii) a second switch electrically coupled to the analogue control line, and (iii) a capacitor arranged between the first and second switch.

13. The quantum computer of claim 11, wherein the one or more sample timing signals are configured to control when either the first analogue memory cell or the second analogue memory cell samples the voltage signal in the channel of the plurality of channels.

14. The quantum computer of claim 11, wherein the one or more synchronisation signals are configured to control when the voltage signal in either the first analogue memory cell or the second analogue memory cell of the channel of the plurality of channels is applied to the DC electrode.

15. The quantum computer of claim 6, further comprising a third analogue memory cell in series with the first analogue memory cell and the second analogue memory cell.

16. The quantum computer of claim 1, wherein the ASIC further comprises a decoder configured to decode the timing control signals.

17. The quantum computer of claim 16, wherein the decoder comprises a shift register configured to transmit a timing control signal of the timing control signals to one or more channels of the plurality of channels.

18. The quantum computer of claim 1, wherein the DAC further comprises a decoder configured to decode the one or more sample timing signals.

19. The quantum computer of claim 18, wherein the DAC is configured to generate a periodic signal.

* * * * *